United States Patent [19]
Mogi

[11] Patent Number: 6,115,064
[45] Date of Patent: *Sep. 5, 2000

[54] VIDEO CAMERA APPARATUS

[75] Inventor: Hirokazu Mogi, Saitama-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/872,310

[22] Filed: Jun. 10, 1997

Related U.S. Application Data

[62] Division of application No. 08/415,141, Mar. 28, 1995, which is a continuation of application No. 08/156,381, Nov. 22, 1993, abandoned, which is a continuation of application No. 08/063,366, May 17, 1993, abandoned, which is a continuation of application No. 07/713,705, Jun. 11, 1991, abandoned.

[30] Foreign Application Priority Data

Jun. 14, 1990 [JP] Japan ................................. 2-156705

[51] Int. Cl.⁷ .......................... H04N 5/262; G03B 13/00
[52] U.S. Cl. ..................... 348/239; 348/347; 348/354; 348/358

[58] Field of Search .................................. 348/239, 347, 348/358, 222, 333, 334, 595, 345, 346, 349, 351, 354–356; H04N 5/262, 5/225; G03B 13/00

[56] References Cited

U.S. PATENT DOCUMENTS

| 4,858,012 | 8/1989 | Hino et al. | 348/213 |
| 5,144,491 | 9/1992 | Ushiro et al. | 359/697 |
| 5,751,351 | 5/1998 | Mogi | 348/239 |

Primary Examiner—Wendy Garber
Assistant Examiner—Ngoc-Yen Vu
Attorney, Agent, or Firm—Robin, Blecker & Daley

[57] ABSTRACT

A video camera apparatus includes a lens for forming an image, a camera circuit for converting the image formed by the lens into an image signal and outputting the image signal, and a controlling circuit for performing an initialization operation in which, before photography is started, information indicative of the state of the optical system is obtained and the lens is initialized, and for controlling an output signal of the camera circuit to fade the output signal in association with the initialization operation.

25 Claims, 6 Drawing Sheets

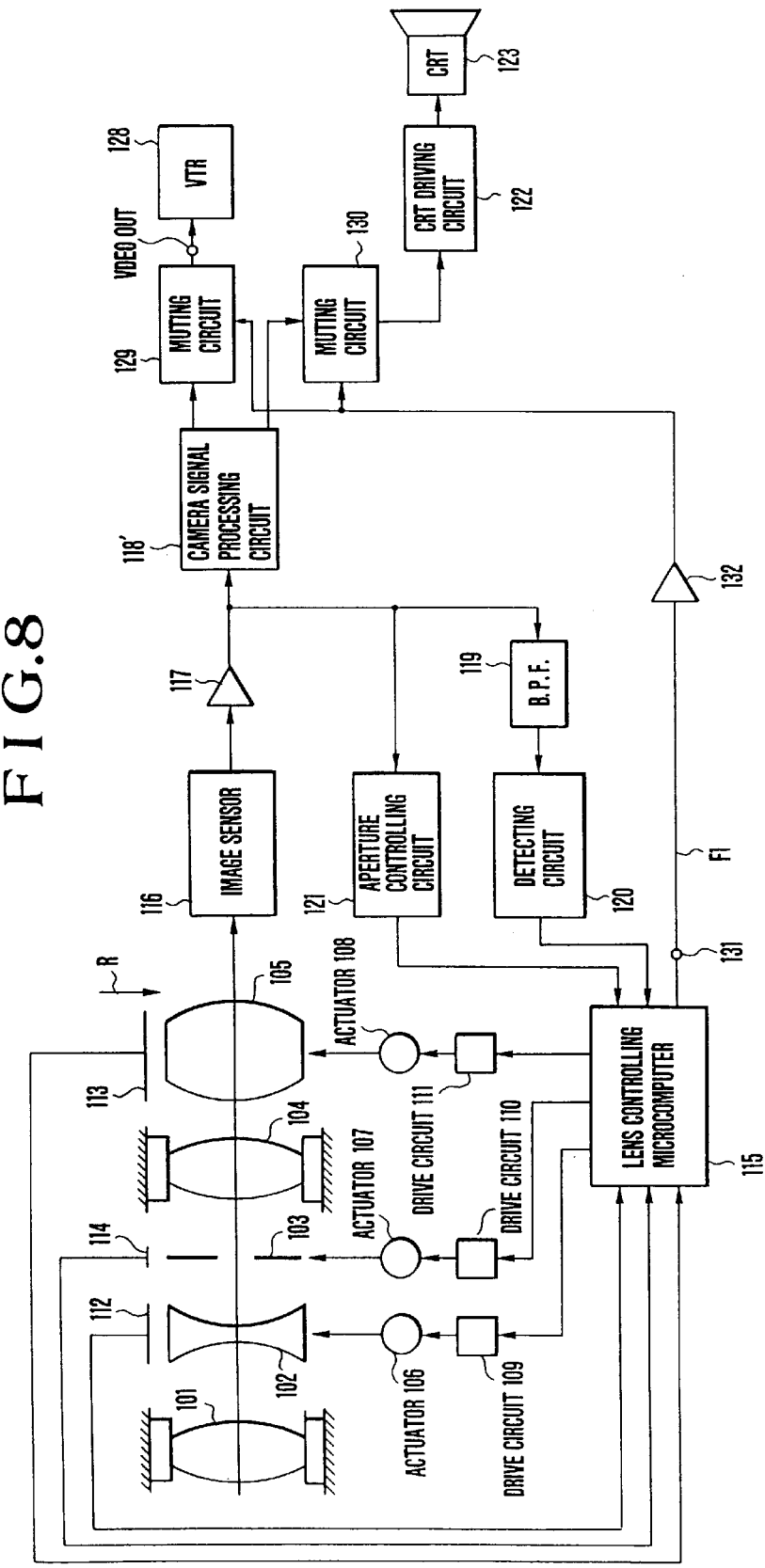

VIDEO CAMERA APPARATUS

This application is a division, of application Ser. No. 08/415,141, filed Mar. 28, 1995, which is a continuation of Ser. No. 08/156,381, filed Nov. 22, 1993, abandoned, which is a continuation of Ser. No. 08/063,366, filed May 17, 1993, abandoned, which is a continuation of Ser. No. 07/713,705, filed Jun. 11, 1991, abandoned.

BACKGROUND OF THE INVENTION

1. Field of the Invention

The present invention relates to a video camera apparatus and, more particularly, to an arrangement suitable for use as a lens controlling device for a video camera.

2. Description of the Related Art

The recent development of video instruments such as video cameras, electronic still cameras and camera-integrated VTRs is remarkable. In particular, the functions and operability of such video instruments have been greatly improved and their size and weight have been increasingly reduced. Among others, camera-integrated VTRs have been rapidly gaining in popularity, and great reductions in their size and weight have been realized owing to the minimization of the number of parts used per VTR as well as changes in the structures of the VTRs themselves.

As a viewfinder used for monitoring an image being photographed, an electronic viewfinder utilizing a small CRT, a liquid-crystal display or the like has been adopted instead of a conventional optical viewfinder. Such an electronic viewfinder not only permits monitoring of an image which is being photographed, but is useful for improving the performance of various operations such as the reproduction of recorded image information or the displaying of various kinds of information.

For example, a typical camera-integrated VTR includes a lens unit which requires relatively large space and parts. To minimize the size of the lens unit, a structure called an inner focus type, such as that shown in FIG. 1, is suitably utilized.

In this type of lens unit, a front lens element is fixed in position and rear lens elements are used to vary magnification or to adjust focus so as to minimize the size of the lens unit.

The lens unit shown in FIG. 1 includes a fixed front lens 101, a magnification varying lens (zooming lens) 102, a n iris 103, a fixed third lens group 104, and a fourth lens group (focusing lens) 105 which performs a focusing function and th e f unction (compensator function) of compensating for the movement of a focal plane due to the movement of the zooming lens 102. The operational characteristics of the lens unit will be described below.

As magnification is varied by moving the zooming lens 102 in the lens unit arranged as shown in FIG. 1, the fourth lens group 105 operates to perform the compensator function and the focusing function as described above. The manner of this operation is shown in FIG. 2.

FIG. 2 shows the positional relation between the zooming lens and the focusing lens with a subject distance as a parameter, and the horizontal axis represents the position of the zooming lens, while the vertical axis represents the position of the focusing lens. As is apparent from FIG. 2, during zooming, if the focusing lens moves along a locus unique to each subject distance, it is possible to continue the zooming without defocus, i.e., in an in-focus state. If the movement of the focusing lens deviates from the unique locus, defocus will occur.

A method of moving the focusing lens along a locus unique to each subject distance during zooming is proposed in, for example, Japanese Laid-open Patent Application No. Hei 1-280709. In this method, the loci shown in FIG. 2 are divided into zones each including a group of loci drawn at an approximately equal inclination, as shown in FIG. 3, and one speed is assigned to each of the zones as a representative speed. During zooming, any one of the zones is selected on the basis of the positional relation between the zooming lens and the focusing lens, and while both lenses are positioned within the selected zone, the focusing lens is made to move at the representative speed assigned to the zone.

However, the above-described method has the problem that the representative speed for each of the zones is determined with respect to a single zooming-lens moving speed and if the zooming-lens moving speed varies due to, for example, a variation in a zooming-motor output, a temperature change, a change in the attitude of the lens unit due to a change in a camera angle or the like, the focusing lens does not correctly follow the loci of FIG. 2.

Japanese Laid-open Patent Application No. Hei 1-319717 proposes a method of adjusting a focusing-lens driving speed during zooming by increasing or decreasing a coefficient to be multiplied by the aforesaid representative speed in accordance with a change in an actual zooming speed.

Referring to FIG. 3, for example, the horizontal axis is divided into 16 equal parts. If it is assumed that the design driving speed of the zooming lens is set to a speed which permits the zooming lens to move between a telephoto end (T) and a wide-angle end (W) in 7 seconds, 26 vertical sync periods (26 Vsync) are required for the zooming lens to pass through a single zooming zone 801 as shown in FIG. 4 in the case of the NTSC system.

In general, if N [Vsync] is taken to pass through the single zone during actual zooming, the change ratio $R_{zs}$ of the actual zooming speed to a reference value ($T \leftrightarrows W$: 7 sec) of the zooming speed is expressed as:

$$R_{zs} = N/26 \quad (1)$$

Accordingly, during zooming, by always measuring the number of vertical sync periods required to pass through the aforesaid single zone and multiplying $1/R_{zs}$ by the aforesaid representative speed, it is possible to perform the zooming at a focusing-lens moving speed according to a variation of the zooming speed without defocus.

In a case where zooming is initially performed after the power source of the apparatus is turned on, there is no measurement data on the zooming speed and no correct value obtained from an actual zooming-lens driving speed is inputted as $R_{zs}$.

The above-described kind of apparatus has additional problems because the measurement of the zooming speed or calculations on Equation (1) have been performed by a microcomputer. If measured values or measurement results are stored in a volatile memory, the stored data are lost when the power source is turned off, and are not used for later control. If zooming is initially performed with data remaining lost after the power source has been turned on, there is no measurement data on the zooming speed and no correct value obtained from an actual zooming-lens driving speed is inputted as $R_{zs}$. As a result, focusing control does not respond to the zooming until a stable measured value N is obtained, and the zooming may start at an utterly different focusing-lens speed.

To compensate for the disadvantage, data may be stored in a non-volatile memory such as an EEPROM. However, if the lens unit is not in use for a long time or if an environment or the aforesaid attitude changes when the power source is again turned on, the zooming speed may change, causing zooming to start at an erroneous focusing-lens driving speed.

To solve the above-described problems, it is necessary to perform various control after the relation between each driven part of a lens optical system and its detecting system is reset to its initial state before photography is started or when the power source is turned on.

To meet the necessity, there is proposed a method of performing a lens resetting operation, i.e., causing the zooming lens to move by the minimum amount required for measurement immediately after the power source has been turned on, determining the initial value of $R_{zs}$, finding an actual focusing-lens speed by multiplying this value of $R_{zs}$ by a representative speed corresponding to the zone where the zooming lens is located, then returning the zooming lens to its original position, and subsequently establishing ordinary operating conditions.

The aforesaid method will be explained below in more detail. It is assumed here that a stepping motor or a similar means which is not easily influenced by inertia and which provides a constant amount of drive with respect to a drive signal and has a wide speed response range, is used as an actuator which constitutes a focusing-lens driving means. In this case, to detect the position of the focusing lens, a method is available which includes the steps of counting the number of drive pulses outputted from the stepping motor by using a counter and causing the count to correspond to the position of the focusing lens. In this method, the counter serving as a position encoder is an incremental counter, and to cause the count to correctly correspond to the coordinate of the vertical axis of the locus diagram of FIG. 2, from the time the power source is turned on until the time an ordinary photographic operation is started, it is necessary to execute control to move the focusing lens 105 to a predetermined position, substitute a value corresponding to the predetermined position into the counter with the focusing lens 105 located at that position, and start counting for detecting the position of the focusing lens 105 which varies with the movement thereof.

In other words, it is necessary to perform various control after the relation between each driven part of the lens optical system and its position detecting system is reset to its initial state before photography is started or when the power source is turned on.

However, in the aforesaid system, while the reset operation of the lens optical system is being performed, the zooming lens moves to cause a variation in a field angle which does not conform to the intention of an operator, whereas the focusing lens moves beyond an effective infinity end to cause a great extent of defocus. As a result, the quality of an image remains seriously degraded until the reset operation is completed.

SUMMARY OF THE INVENTION

A first object of the present invention which has been made to solve the above-described problems is to provide a video camera apparatus capable of smoothly performing an initialization operation before photography.

A second object of the present invention is to eliminate a variation or a disturbance from a camera circuit output which takes place during an initialization operation, thereby preventing a degraded image from being outputted.

A third object of the present invent-ion is to prevent a degraded image from being outputted to a monitor during the initialization operation of a video camera apparatus.

To achieve the above objects, in accordance with one aspect of the present invention, there is provided a video camera apparatus which comprises an optical system for forming an image, a camera part for converting the image formed by the optical system into an image signal and outputting the image signal, initializing means for performing an initialization operation in which, before photography is started, information indicative of a state of the optical system is obtained and the optical system is initialized, and controlling means for controlling an output signal of the camera part to place the output signal in a predetermined state in association with the initialization operation.

A fourth object of the present invention is to fade a picture displayed in an electronic viewfinder of a video camera apparatus during the initialization operation thereof to prevent an abnormal variation from appearing in the picture, thereby improving an operational sensation.

To achieve the above object, in accordance with another aspect of the present invention, there is provided a video camera apparatus which comprises an optical system for forming an image, a camera part for converting the image formed by the optical system into an image signal and outputting the image signal, an electronic viewfinder for displaying an image represented by an output signal of the camera part, initializing means for performing an initialization operation in which, before photography is started, information indicative of a state of the optical system is obtained and the optical system is initialized, and controlling means for fading an image displayed in the electronic viewfinder in association with the initialization operation.

A fifth object of the present invention is to inhibit a recording operation from being performed in a recorder part, thereby preventing an unstable camera circuit output from being recorded during the initialization operation of a video camera apparatus.

To achieve the above object, in accordance with another aspect of the present invention, there is provided a video camera apparatus which comprises a lens unit for forming an image, a camera part for converting the image formed by the optical system into an image signal and outputting the image signal, a recorder part for applying predetermined processing to the image signal outputted from the camera part and recording the image signal, resetting means for performing a reset operation in which, before photography is started, information indicative of a state of movement of a driven element for varying an optical state of the lens unit is obtained and the lens unit is reset, and controlling means for outputting a control signal for inhibiting the recorder part from performing a recording operation during the reset operation.

A sixth embodiment of the present invention is to provide a video camera apparatus which is capable of fading an image output signal to prevent a degraded image from being outputted during the initialization operation of a lens unit and also of causing the function of fading a video signal to operate in synchronization with a lens resetting operation by communicating the end of the initialization operation of the lens unit to a camera controlling circuit. The video camera apparatus not only mutes an abnormal image but can positively fade it during a lens resetting operation only to start an ordinary photographic operation and display an image upon completion of the lens resetting operation even if the time required for the lens resetting operation varies depending on the driving position of each lens.

A seventh embodiment of the present invention is to provide a video camera apparatus which can fade a camera output and an image displayed in a viewfinder in synchronization with the period of a lens resetting operation, to prevent a degraded image from being outputted due to the variation of a field angle, defocus or the like which takes place during the lens resetting operation, thereby making it possible to improve the quality of-the video camera apparatus and also to prevent an abnormal image from being recorded. In addition, since the period during which the camera output is faded is synchronized with the period of the lens resetting operation, the video camera apparatus can reduce its fading period to the required minimum time, thereby minimizing a standby period which is required until ordinary image recording is ready.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 8 is a block diagram schematically showing a second embodiment of a video camera apparatus according to the present invention.

DETAILED DESCRIPTION OF THE PREFERRED EMBODIMENTS

Preferred embodiments of the present invention will be described below with reference to the accompanying drawings.

Figure 5:
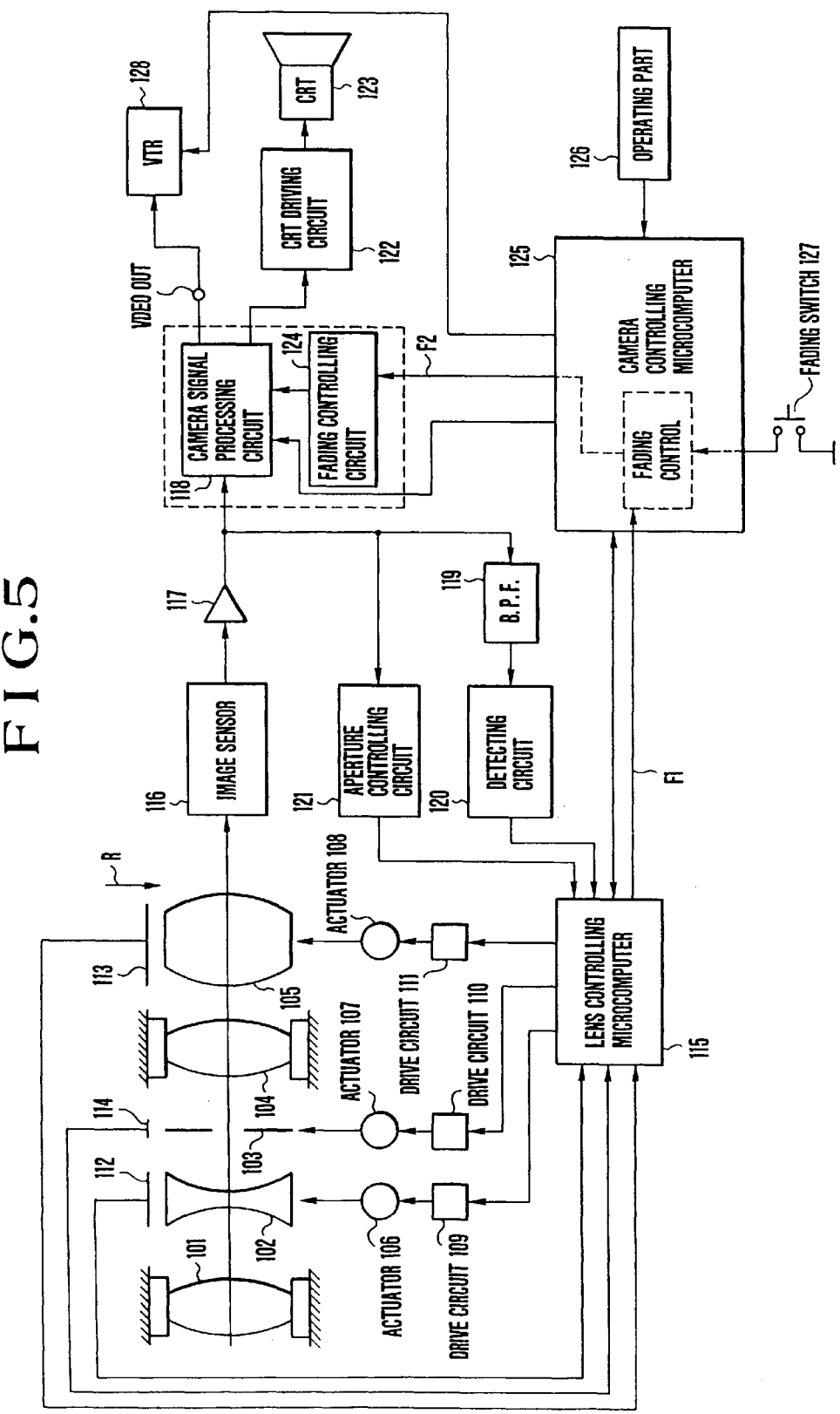
FIG. 5 is a block diagram schematically showing a first embodiment of a video camera apparatus according to the present invention.

FIG. 5 is a block diagram schematically showing the arrangement of a first embodiment of a video camera apparatus according to the present invention.

Figure 1:
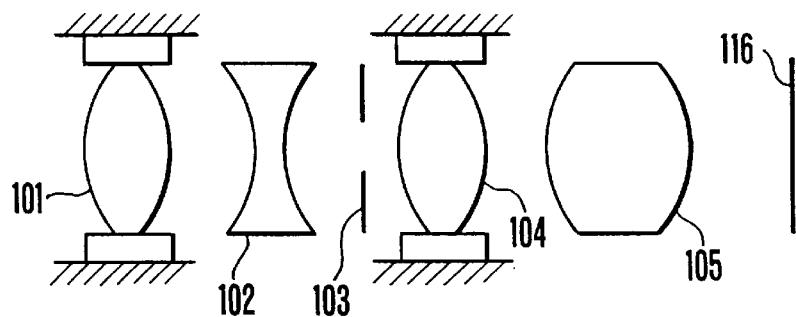
FIG. 1 is a schematic view showing one example of an inner focus type of lens structure.

Referring to FIG. 5, the shown lens part comprises optical system elements 101, 102, 103, 104 and 105 each having a function substantially equivalent to that of the corresponding element explained in connection with FIG. 1, actuators 106, 107 and 108 for driving the zooming lens 102, the iris 103 and the focusing lens 105, respectively, each of the actuators 106, 107 and 108 consisting of, for example, a motor or the like, drive circuits 109, 110 and 111 for driving and controlling the respective actuators 106, 107 and 108, and position encoders 112, 113 and 114 for detecting the respective positions of the zooming lens 102, the focusing lens 105 and the iris 103 which are being driven.

A lens controlling microcomputer (hereinafter referred to as a "lens microcomputer") 115 controls individual driven systems, such as the focusing lens 105, the zooming lens 102 and the iris 103, on the basis of iris control information transmitted from an aperture controlling circuit 121, a signal representative of the state of focus transmitted from a detecting circuit 120, control information supplied from each of the position encoders 112, 113 and 114 and control information transmitted from a camera controlling microcomputer 125 which will be described later.

A fixed reset switch R detects whether the focusing lens 105 has reached a reset position which is set in advance.

The shown camera part comprises an image sensor 116, such as a CCD, for converting an image formed by a lens unit into a video signal and outputting it therefrom, an amplifier 117 for amplifying the output signal of the image sensor 116, a camera signal processing circuit 118 for applying predetermined signal processing, such as blanking processing, gamma correction and addition of a sync signal, to the output signal of the amplifier 117 and outputting a standardized video signal to a VTR 128 or to an external circuit, and a CRT driving circuit 122 for supplying a video signal outputted from the camera signal processing circuit 118 to an electronic viewfinder or to an externally connected monitor 123.

A band-pass filter 119 takes out only a high-frequency component useful for detecting the state of focus from the output signal of the amplifier 117. A detecting circuit 120 detects the high-frequency component outputted from the band-pass filter 119, and converts a DC level signal according to the state of focus. The output signal of the detecting circuit 120 is supplied to the lens microcomputer 115. The lens microcomputer 115 samples the output of the detecting circuit 120 at intervals of, for example, one field to cause the focusing lens 105 to move in the direction in which the high-frequency component increases, thereby executing focusing.

Simultaneously, the lens microcomputer 115, as described above, causes the focusing lens 105 to move in follow-up relation to the zooming lens 102, thereby executing control for compensating for a variation in the position of a focal plane due to zooming.

The aperture controlling circuit 121 measures the luminance of a subject on the basis of the luminance level of an output signal of the amplifier 117 to adjust the aperture size of the iris 108, thereby maintaining a constant luminance.

A fading controlling circuit 124 fades a video signal outputted from the camera signal processing circuit 118 and a video signal supplied to the monitor 123, on the basis of a control signal supplied from the camera microcomputer 125 which will be described later. The term "fading" used herein is a generic term which means the process of making a picture all in single color, for example, white, black or another color.

The camera controlling microcomputer (hereinafter referred to as a "camera microcomputer") 125 controls the operation of the entire camera including each circuit block such as the camera signal processing circuit 118 and the VTR 128. Also, the camera microcomputer 125 transmits control information corresponding to the operational states of the respective circuit blocks so as to control the lens microcomputer 115. The shown camera part also includes an operating part 126 consisting of various kinds of operating switches for operating the camera, and a fading switch 127 for fading a video signal outputted from the camera signal processing circuit 118.

A program for controlling the fading controlling circuit 124 is stored in the camera microcomputer 125 to control the fading controlling circuit 124 in accordance with either the operation of the fading switch 127 or, as described later, a signal indicating that a lens resetting operation is being executed and a signal indicating that the lens resetting operation has been completed, both signals being supplied from the lens microcomputer 115.

As is described detail later, the fading controlling circuit 124 operates to apply fading to a video signal during a lens resetting operation or when the fading switch 127 is operated.

Figure 6:
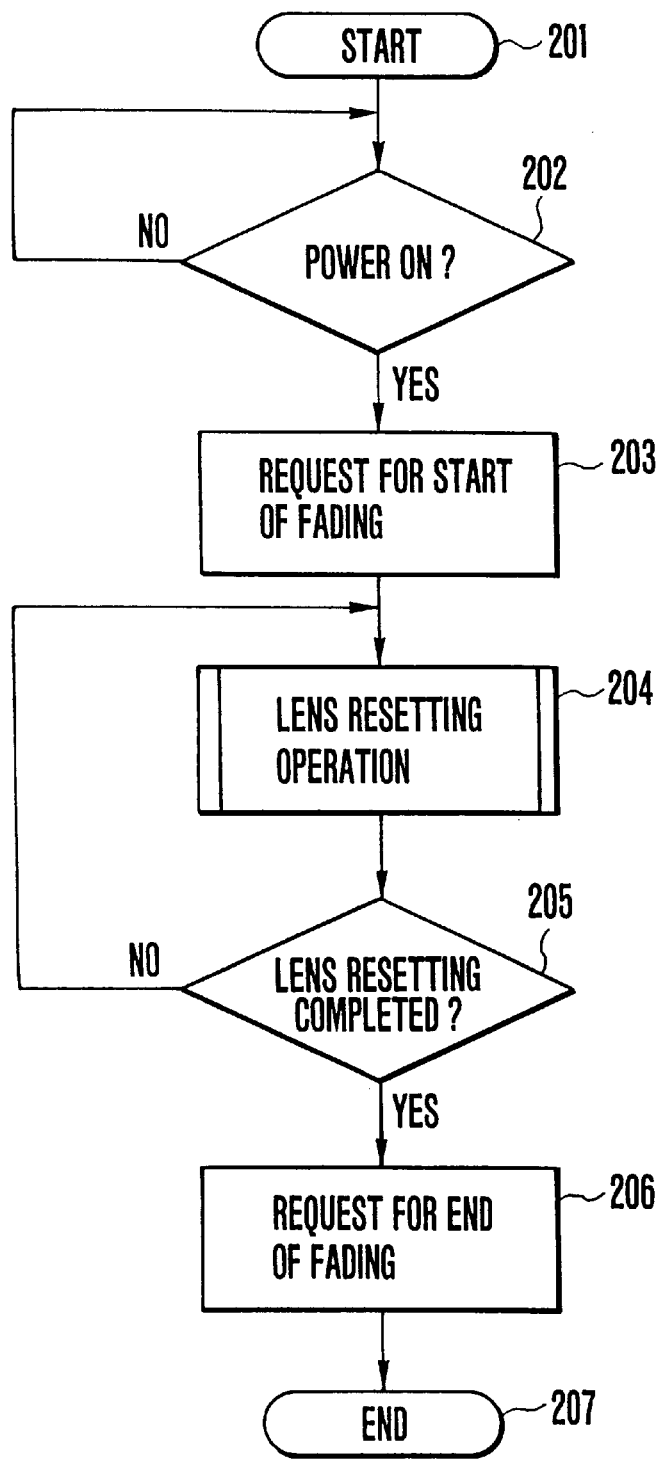
FIG. 6 is a flowchart showing a control operation in the first embodiment shown in FIG. 5.

A control operation according to the first embodiment will be described below with reference to the flowchart of FIG. 6.

The shown control flow is executed in accordance with the control program stored in the lens microcomputer 115.

The shown control flow includes Step 201 for starting execution of a control operation, Step 202 for determining whether the power source has been turned on, and Step 203 for starting fading when the power source in the video camera apparatus is turned on. In Step 203, as shown in FIG. 5, a fading start signal Fl for starting fading is outputted from the lens microcomputer 115 to the camera microcomputer 125. The fading start signal F1 may be represented by independently using one bit such as a signal of "0" or "1", or may be realized by serial data communication or the like in common with the communication of other various kinds of control signals. When the camera microcomputer 125 receives the fading start signal Fl from the lens microcomputer 115, it outputs a fading control signal F2 to the fading controlling circuit 124 in accordance with a fading controlling program stored in the camera microcomputer 125, thereby causing the fading controlling circuit 124 to fade a video signal outputted from the camera signal processing circuit 118. In design, the kind of fading can be arbitrarily selected from among white fading for making a picture all in white by fading, black fading for making a picture all in black by fading, and other fading for making a picture all in another color, i.e., a predetermined single color.

In Step 204, a lens resetting operation is executed as will be described in detail later.

In Step 205, it is determined whether the lens resetting operation has been completed. Information indicative of the completion of the lens resetting operation is transmitted by inverting the bit of the fading start signal Fl outputted from the lens microcomputer 115 to the camera microcomputer 125.

In Step 206, if it is determined that the lens resetting operation has been completed, it is requested that the fading of the video signal be immediately brought to an end. The fading operation of the fading controlling circuit 124 is cancelled by the fading control signal F2 outputted from the camera microcomputer 125, thereby cancelling the fading of the video signal outputted from the camera signal processing circuit 118 to the VTR 128 and to the monitor 123 via the CRT driving circuit 122.

By the above-described operation, while the lens resetting operation is being performed, the video signal output is reliably faded or control is executed so that the entire picture is represented in a single color. Accordingly, it is possible to reliably prevent a degraded image signal from being outputted during the lens resetting operation.

In addition, the period during which an image fading operation is performed is set to the period of each individual lens resetting operation by detecting the start and end thereof. Accordingly, it is possible to eliminate a disadvantage which has been experienced if a fixed time is set for the image fading operation, that is, the disadvantage that if a lens resetting operation is completed before the fixed time elapses, the image fading operation will continue for an unduly long time, while if the lens resetting operation is performed for a period longer than the fixed time, a distorted image is outputted.

The lens resetting operation executed in Step 204 of the flowchart of FIG. 6 will be described below. The lens resetting operation is performed by executing a control program stored in the lens microcomputer 115.

Figure 7A:
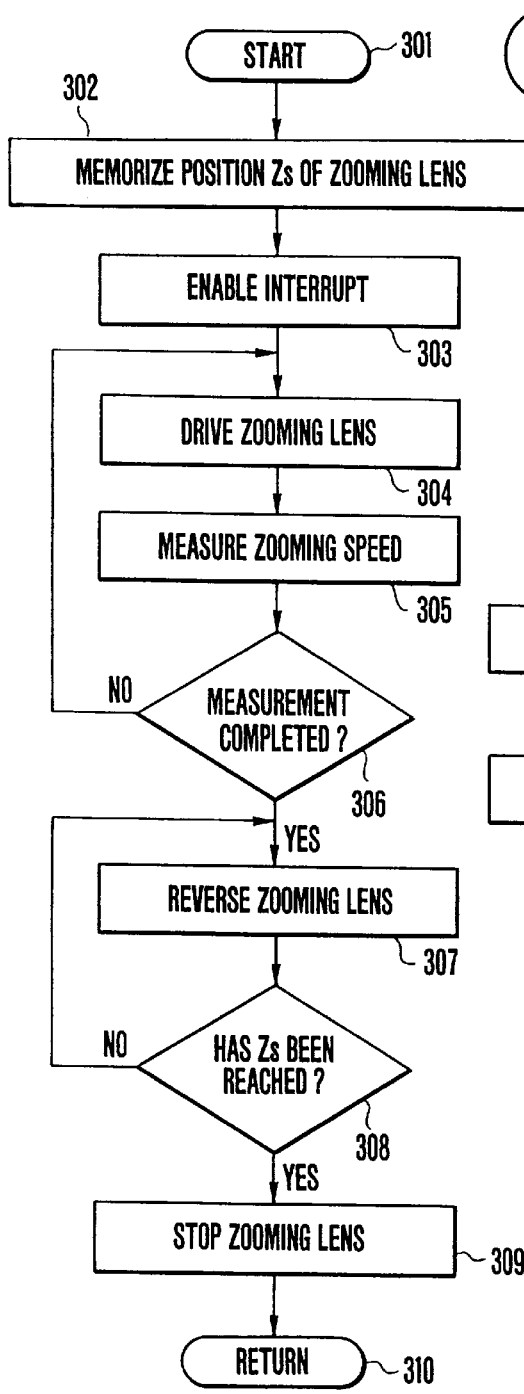
FIGS. 7(a) and 7(b) are flowcharts showing a lens resetting operation.
Figure 7B:
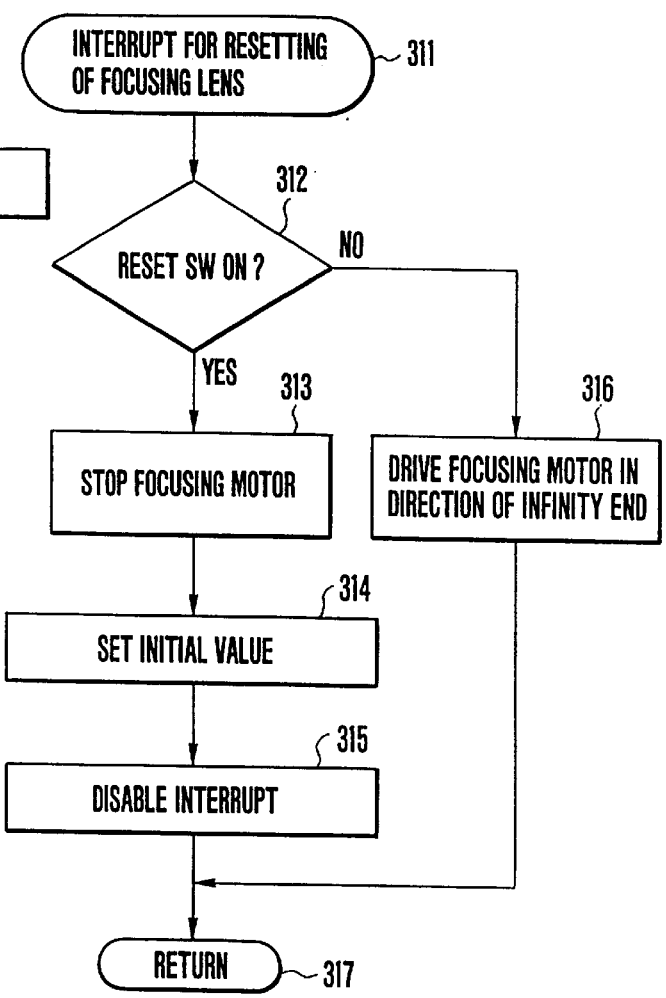

FIGS. 7(a) and 7(b) show flowcharts showing the lens resetting operation executed by the lens microcomputer 115.

In the control program, a reset operation for resetting the zooming lens 102 and a reset operation for resetting the focusing lens 105 are processed concurrently in parallel by interrupt processing.

The flowchart shown in FIG. 7(a) includes Step 301 which indicates the start of the control program; Step 302 in which the value of the zooming encoder 112, i.e., the position of the zooming lens 102 which is in motion, is read and memorized as Zs; Step 303 in which a reset program which is executed when the focusing lens 105 arrives at its reset position is enabled by interrupt processing while the zooming lens 102 is being reset; Step 304 in which the zooming lens 102 is driven to move toward either one of wide-angle and telephoto sides so as to execute a reset operation for the zooming lens 102; Step 305 in which measurement of a zooming-lens driving speed is performed by, for example, the method described previously; Step 306 in which it is determined whether the measurement of the zooming lens driving speed has been completed; Step 307 in which the zooming lens 102 is driven to move in a direction opposite to the direction in which it has been driven in Step 304; Step 308 in which it is determined whether the output of the zooming encoder 112 has reached Zs memorized in step 302, i.e., whether the zooming lens 102 has returned to the position where it was placed before driving; Step 309 in which the driving of the zooming lens 102 is stopped if it is determined in Step 308 that the position of the zooming lens 102 has restored to Zs memorized in Step 302; and Step 310 which indicates the end of the control program.

The flowchart of FIG. 7(b) including Steps 311 to 317 shows the control flow of an interrupt subroutine which is executed each time an interrupt is enabled in Step 303 during the execution of the flow of Steps 301 to 310.

The flowchart of FIG. 7(b) includes Step 311 which indicates the start of the interrupt processing, i.e., processing for resetting a counter for position detection as to the aforesaid focusing lens 105; Step 312 in which it is determined whether the reset switch R for detecting the reset position of the focusing lens 105 has been turned on; Step 313 in which the focusing motor 108 is stopped when it is determined that the reset switch R has been turned on; Step 314 in which the counter which is set in the lens microcomputer 115 for the purpose of detecting the position of the focusing lens 105 is initialized by substituting a predetermined value into the counter; Step 315 in which the above-described interrupt is disabled; Step 316 in which if the reset switch R is not on, the focusing motor 108 is driven to move the focusing lens 105 toward an infinity end; and Step 317 in which the above-described interrupt program is brought to an end and the process returns to an interrupt point so as to resume the control flow of Steps 301 to 310.

It is assumed here that the position of the reset switch R is set to a position which is below the horizontal axis of FIG. 3 as shown by a reference numeral 701 therein, that is, a position which is beyond the infinity end within the actual operating range of the focusing lens 105.

When the control flow is started in Step 301, the output value of the zooming encoder 112, i.e., the position of the zooming lens 102, is read and memorized as Zs in a predetermined memory area within the lens microcomputer 115. In Step 303, processing is performed which enables an interrupt to execute an interrupt program for resetting the counter for position detection as to the focusing lens 105. After this processing, the reset operation of the aforesaid counter is executed in parallel with the speed measurement of the zooming lens 102. The reset operation of the zooming lens 102 is first explained and the interrupt program is explained later.

After the interrupt has been enabled, the zooming lens 102 is made to move in either direction in Step 304 to measure the moving speed of the zooming lens 102. In Step 305, while the zooming lens 102 is being moved, the output value of the zooming encoder 112 is consistently supervised and speed measurement is performed, as described above, for example by examining how many vertical sync periods are required for the zooming lens 102 to pass through one or more zones which are formed in the direction of movement of the zooming lens 102. The above-described operation is repeated until it is determined in Step 306 that the zooming lens 102 has passed through a predetermined number of zones and the speed measurement has been completed.

When the completion of the measurement is confirmed in Step 306, the process proceeds to Step 307, where the zooming lens 102 is made to move in a direction opposite to the direction in which the zooming lens 102 has been driven in Step 304. If it is determined in Step 308 that the output value of the zooming encoder 112 has reached the zooming-lens position Zs memorized in Step 302, that is, when the zooming lens 102 returns to its original position, the process proceeds to Step 309, where the driving of the zooming lens 102 is stopped, thus completing the reset operation.

Figure 2:
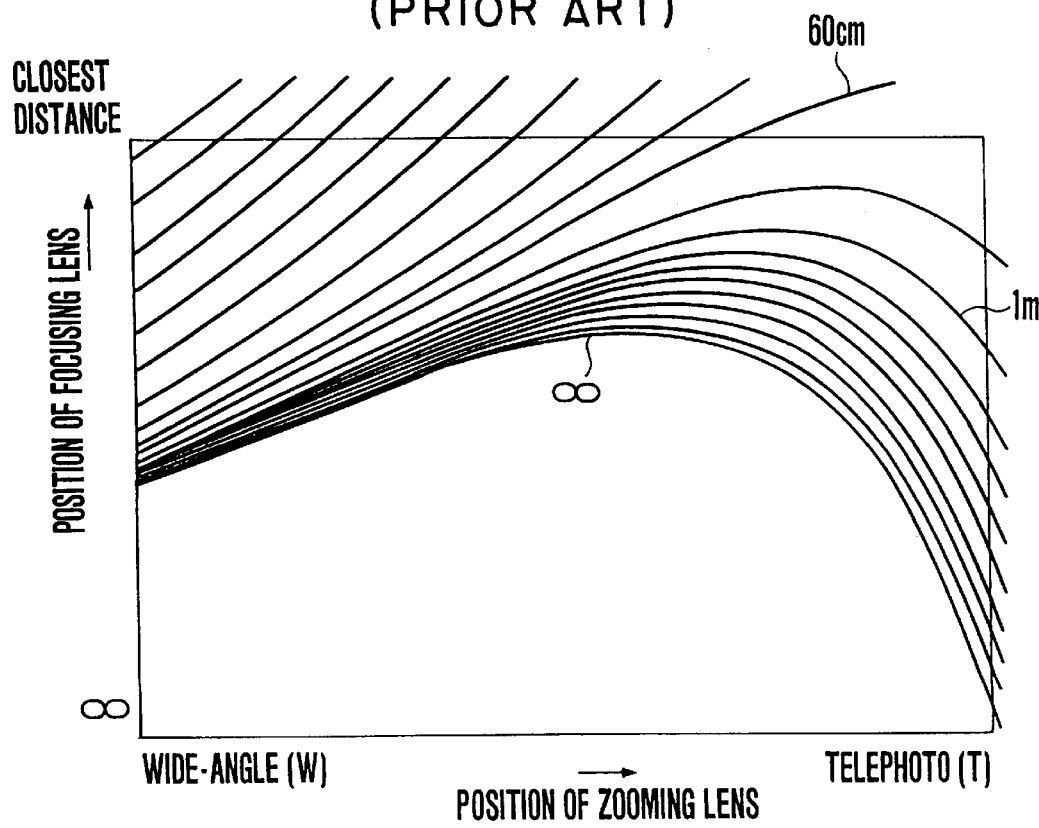
FIG. 2 is a characteristic diagram showing the positional relation between a zooming lens and a focusing lens with a subject distance as a parameter.

By the above-described processing, the actual driving speed of the zooming lens 102 is measured and the ratio of the measured speed to a normal speed is obtained by using the above-noted equation (1). The normal representative speed of the focusing lens 105 which is set for the zone in which the zooming lens 102 is positioned, i.e., one of the zones shown in FIG. 3, is corrected on the basis of the aforesaid ratio. Accordingly, as the zooming lens 102 is driven, it is possible to cause the focusing lens 105 to move in follow-up relation to the zooming lens 102 while accurately tracing the corresponding curve in FIG. 2, whereby zooming free from defocus can be achieved.

The reset operation of the counter for position detection as to the focusing lens 105 which is executed after the interrupt has been enabled in Step 303, will be described below. This reset operation carries out processing for accurately presetting position information on the focusing lens 105 in the position detection counter for the same and highly accurately controlling and driving the focusing lens 105 in accordance with the loci shown in FIG. 2 so that the position of the focusing lens 105 can be accurately detected.

When the interrupt program starts in Step 311, the process proceeds to Step 312, where it is determined whether the reset switch R is on.

Figure 3:
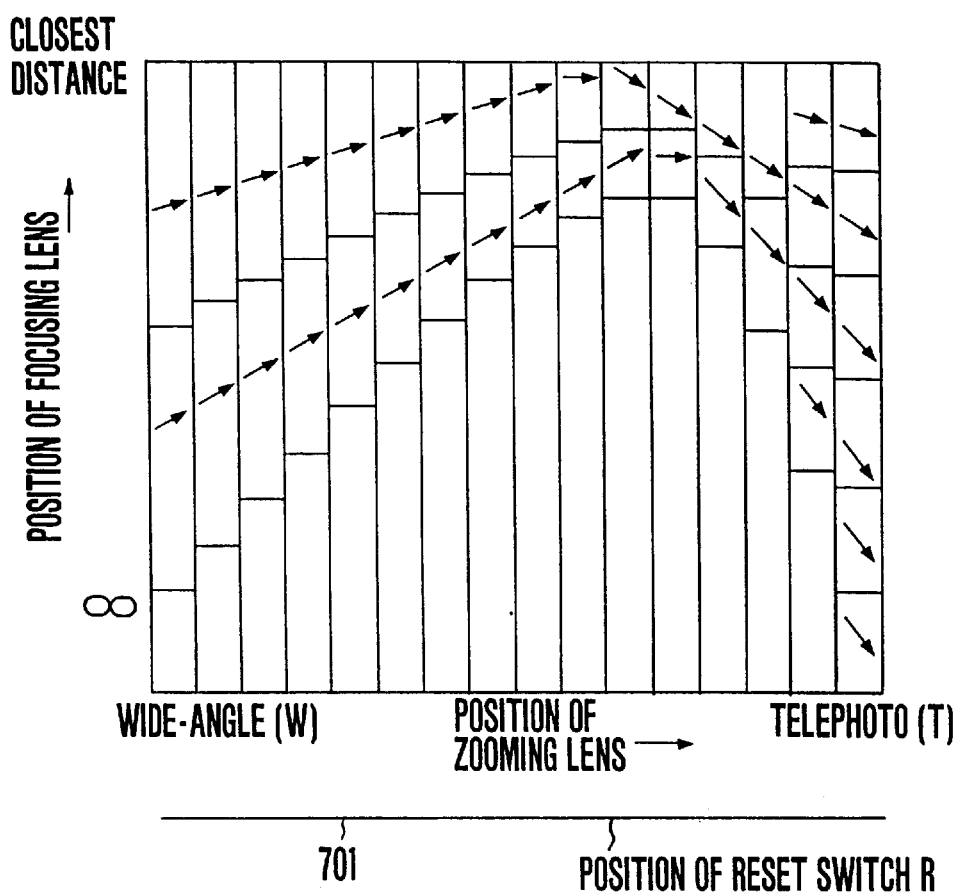
FIG. 3 is a chart showing a state wherein the positional relation between the position of the zooming lens and that of the focusing lens is divided into a plurality of zones and a representative speed of the focusing lens is set for each of the zones.
Figure 4:
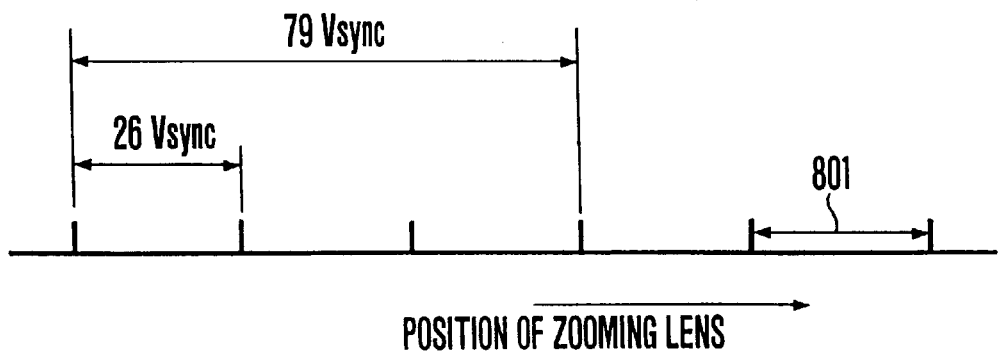
FIG. 4 is a schematic view which is used for explaining the speed measurement of the zooming lens.

If the reset switch R is fixed at the position shown by reference numeral 701 in FIG. 3, it follows that the reset switch R is necessarily positioned on the infinity side with respect to an ordinary in-focus range from the closest distance to infinity (a range marked with speed vectors in FIG. 3). Accordingly, if the power source is turned off and again turned on in ordinary operating conditions, the focusing lens 105 will be naturally located somewhere within the ordinary in-focus range from the closest distance to infinity. Therefore, if the reset switch R has not been turned on in Step 312, it can be determined that the focusing lens 105 is necessarily located on the closet-distance side with respect to the position 701.

Accordingly, if the reset switch R has not been turned on in Step 312, the process proceeds to Step 316, where the actuator 108 of the focusing lens 105 is driven in the direction of the infinity end. Subsequently, each time an interrupt takes place, the above-described operation is repeated.

If it is determined in Step 312 that the reset switch R has been turned on, the process proceeds to Step 313, where the focusing-lens driving actuator 108 is stopped. At this time, the position of the focusing lens 105 corresponds to the position of the reset switch R. Accordingly, in Step 314, a value corresponding to the position of the reset switch R is substituted into the position detection counter for the focusing lens 105. In Step 315, the interrupt is disabled to prevent the focusing lens 105 from accidentally moving.

By the above-described processing, it is possible to concurrently perform the reset operation of the zooming lens 102 and that of the focusing lens 105. The interrupt enabling step and the interrupt disabling step are inserted so that if the reset operation of the focusing lens 105 is completed, no further reset operation is performed. It is, therefore, possible to prevent a malfunction and to improve a computing speed.

As described above, in accordance with the first embodiment, each time the power source is turned off, the reset operation of the lens unit is performed so that each lens can be correctly controlled. In addition, fading can be effected so that no distorted image is recorded or displayed during the reset operation. The length of fading time can be set in accordance with the time required for the reset operation. Accordingly, it is possible to provide a video camera apparatus which is improved in quality and response speed.

FIG. 8 shows a second embodiment of a video camera apparatus according to the present invention.

The second embodiment performs a control operation similar to that of the first embodiment described above. The second embodiment is not provided with a camera microcomputer. (For example, a lens microcomputer or a control microcomputer incorporated in a VTR may also serve the function of the camera microcomputer, or there may also be a case where although a camera microcomputer is provided, no fading control is being performed.) A camera signal processing circuit 118' does not have a fading function, and, instead, muting circuits 129 and 130 which respectively mute video signals for input to the VTR 128 and to the CRT driving circuit 122 for the monitor 123 are provided on the output side of the camera signal processing circuit 118'. The muting circuits 129 and 130 are controlled by the fading start signal Fl outputted from the lens microcomputer 115 so as to mute a camera output and a signal for output to the monitor 123 such as an electronic viewfinder.

In FIG. 8, identical reference numerals are used to denote constituent elements substantially identical to those shown in FIG. 5, and a description thereof is omitted.

Referring to FIG. 8, the camera signal processing circuit 118' performs signal processing similar to that of the camera signal processing circuit 118 used in the first embodiment, but has no fading function unlike the camera signal processing circuit 118. As shown, the second embodiment comprises a fading control terminal 131 for outputting a fading request (the fading start signal F1) from the lens microcomputer 115 to an external circuit, the muting circuits 129 and 130 which are controlled by the fading start signal F1, and a buffer amplifier 132.

In the apparatus according to the second embodiment, when a fading request represented by the fading start signal F1 is outputted from the lens microcomputer 115, the buffer amplifier 132 supplies the fading request to each of the muting circuits 129 and 130 so that camera outputs to be supplied to the VTR 128 and the monitor 123 such as an electronic viewfinder are muted. Accordingly, like the aforesaid first embodiment, it is possible to realize a video camera apparatus of improved quality which can prevent the VTR 128 or the monitor 123 from recording or displaying a distorted image.

In each of the above-described embodiments, since signals indicative of the start and completion of a lens resetting operation are accurately transmitted to a control microcomputer, it is possible to realize control responsive to the signals for inhibiting a VTR from recording an image during the lens resetting operation.

As is apparent from the foregoing description, in the video camera apparatus according to the present invention, a camera output and an image displayed in a viewfinder are faded in synchronization with the period of a lens resetting operation, whereby it is possible to prevent a degraded image from being outputted due to the variation of a field angle, defocus or the like which takes place during the lens resetting operation. Accordingly, it is possible to improve the quality of a video camera apparatus and also to prevent an impaired image from being recorded.

In addition, since the period during which a camera output is faded is synchronized with the period of the lens resetting operation, it is possible to reduce a fading period to the required minimum time, whereby it is possible to minimize a standby period which is required until ordinary image recording is ready.

What is claimed is:

1. An image pickup apparatus, comprising:
   a) an image pickup lens;
   b) drive circuit for driving said pickup lens;
   c) an image sensor for converting an image formed on an image sensing plane through said image pickup lens to an image signal:
   d) signal processing circuit for performing a predetermined processing to the image signal output from said image sensor so as to produce a video signal;
   e) monitor display for displaying an image corresponding to the video signal;
   f) recording part for recording the video signal output from said signal processing circuit ;
   g) signal producing circuit for producing and outputting a predetermined signal pattern;
   h) lens-micro computer for executing a reset operation of said image pickup lens which drives said image pickup lens to a reset position and outputting a reset completion signal in response to a completion of the reset operation; and
   i) camera-micro computer for causing said monitor to display the predetermined signal pattern output from said signal producing circuit and inhibiting a recording operation of said recording part in response to a power-on operation and stopping the output of the predetermined signal pattern, supplying the video signal output from said signal processing circuit to said monitor and permitting said recording part to record the video signal in response to receiving of the reset completion signal from said lens-micro computer.

2. An image pickup apparatus according to claim 1, wherein said signal producing circuit fades an output of a camera part in association with the reset operation.

3. An image pickup apparatus according to claim 2, wherein said camera-micro computer controls the video signal of said signal processing circuit to place said video signal in a state representative of a picture made all in single color.

4. An image pickup apparatus according to claim 2, wherein said camera-micro computer places the output of said signal processing circuit in a state representative of a picture made all in single color during the reset operation of said lens-micro computer.

5. An image pickup apparatus according to claim 1, wherein said image pickup lens is an inner focus type lens system.

6. An image pickup apparatus according to claim 5, wherein said lens-micro computer performs an operation for adjusting a follow-up speed at which a focusing lens of said image pickup lens is made to move in follow-up relation to a movement of a zooming lens.

7. An image pickup apparatus, comprising
   a) an image sensor for converting an image formed on an image sensing plane by an optical system to an image signal;
   b) signal processing circuit for performing a predetermined processing to the image signal output from said image sensor so as to produce a processed image signal;
   c) signal generating circuit for generating and outputting a predetermined color signal pattern; and
   d) control circuit, in response to a reset operation of said optical system which drives said optical system to a reset position, for inhibiting an output of the processed image signal to a monitor display and causing said signal generating circuit to output the predetermined color signal pattern to said monitor display, and causing said signal generating circuit to stop the output of the predetermined color signal pattern and permitting the output of the processed image signal to said monitor display in response to receiving of the reset completion signal indicating a completion of the reset operation.

8. An apparatus according to claim 7, wherein said monitor display is an electronic view finder.

9. An apparatus according to claim 7, wherein said optical system includes a zooming lens and a focusing lens for compensating a variation of a focal position due to a movement of said zooming lens.

10. An apparatus according to claim 9, wherein said control circuit performs the reset operation in response to POWER-ON and driving said zooming lens to a first resetting position and driving said focusing lens to a second resetting position.

11. An apparatus according to claim 7, further comprising recording part for recording the processed image signal output from said signal processing circuit, said control circuit inhibit a recording operation of said recording part during the reset operation.

12. An apparatus according to claim 7, further comprising muting circuit for muting the processed image signal during the reset operation.

13. An image pickup apparatus, comprising:

a) an image sensor for converting an image formed on an image sensing plane by an optical system to an image signal;

b) signal processing circuit for performing a predetermined processing to the image signal output from said image sensor so as to produce a processed image signal;

c) signal fading circuit for fading the processed image signal and causing a monitor display to displaying a predetermined signal pattern; and d) control circuit, in response to a reset operation of said optical system which drives said optical system to a reset position, for inhibiting an output of the processed image signal to a monitor display and causing said signal fading circuit to output the predetermined signal pattern to said monitor display, and causing said signal fading circuit to stop the output of the predetermined signal pattern and permitting the output of the processed image signal to said monitor display in response to receiving of a reset completion signal indicating a completion of the reset operation.

14. An apparatus according to claim 13, wherein said monitor display is an electronic view finder.

15. An apparatus according to claim 13, wherein said optical system includes a zooming lens and a focusing lens for compensating a variation of a focal position due to a movement of said zooming lens.

16. An apparatus according to claim 15, wherein said control circuit performs the reset operation in response to POWER-ON and driving said zooming lens to a first resetting position and driving said focusing lens to a second resetting position.

17. An apparatus according to claim 13, further comprising recording part for recording the processed image signal output from said signal processing circuit, said control means inhibit a recording operation of said recording part during the reset operation.

18. An apparatus according to claim 13, further comprising muting circuit for muting the processed image signal during the reset operation.

19. An apparatus according to claim 13, wherein said signal fading circuit displays a single color pattern on said monitor display.

20. A lens control method, comprising:

(A) a signal processing step of performing a predetermined processing to an image signal output from an image sensor so as to produce a processed image signal;

(B) a signal generating step of generating and outputting a predetermined color signal pattern; and (C) a resetting step of performing a reset operation of an optical system which drives said optical system to a reset position; and (D) a control step of, in response to said reset operation of said optical system, inhibiting an output of the processed image signal to a monitor display and outputting the predetermined color signal pattern generated in said signal generating step to said monitor display, and stopping the output of the predetermined color signal pattern and permitting the output of the processed image signal to said monitor display in response to receiving of the reset completion signal indicating a completion of the reset operation.

21. A method according to claim 20, wherein said monitor display is an electronic viewfinder.

22. A method according to claim 20, wherein said optical system includes a zooming lens and a focusing lens for compensating a variation of a focal position due to a movement of said zooming lens.

23. A method according to claim 22, wherein said control step performs the reset operation in response to POWER-ON and driving said zooming lens to a first resetting position and driving said focusing lens to a second resetting position.

24. A method according to claim 20, further comprising recording step of recording the processed image signal generated in said signal processing step, said control step inhibits a recording operation in said recording step during the reset operation.

25. A method according to claim 20, further comprising muting step of muting the processed image signal during the reset operation.

* * * * *

UNITED STATES PATENT AND TRADEMARK OFFICE
CERTIFICATE OF CORRECTION

PATENT NO. : 6,115,064
DATED : September 5, 2000
INVENTOR(S) : Hirokazu Mogi

It is certified that error appears in the above-identified patent and that said Letters Patent is hereby corrected as shown below:

Column 1,
Line 49, delete "th e f unction" and insert -- the function --.

Column 5,
Line 6, delete "of-the" and insert -- of the --.

Signed and Sealed this

Sixth Day of November, 2001

Attest:

*Nicholas P. Godici*

NICHOLAS P. GODICI
*Attesting Officer*    *Acting Director of the United States Patent and Trademark Office*